United States Patent
Mozolewski et al.

(10) Patent No.: US 10,153,979 B2
(45) Date of Patent: Dec. 11, 2018

(54) PRIORITIZATION OF NETWORK TRAFFIC IN A DISTRIBUTED PROCESSING SYSTEM

(71) Applicant: HEWLETT PACKARD ENTERPRISE DEVELOPMENT LP, Houston, TX (US)

(72) Inventors: Mark Brian Mozolewski, Roseville, CA (US); Carlos Villarreal, Roseville, CA (US); Sumanth M Sathyanarayana, Roseville, CA (US); Michael R Smith, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 127 days.

(21) Appl. No.: 15/301,047

(22) PCT Filed: Mar. 31, 2014

(86) PCT No.: PCT/US2014/032365
§ 371 (c)(1),
(2) Date: Sep. 30, 2016

(87) PCT Pub. No.: WO2015/152871
PCT Pub. Date: Oct. 8, 2015

(65) Prior Publication Data
US 2017/0034063 A1 Feb. 2, 2017

(51) Int. Cl.
*H04L 12/855* (2013.01)
*H04L 12/755* (2013.01)
(Continued)

(52) U.S. Cl.
CPC ........ *H04L 47/2466* (2013.01); *H04L 45/021* (2013.01); *H04L 45/64* (2013.01);
(Continued)

(58) Field of Classification Search
CPC . H04L 47/2466; H04L 67/10; H04L 47/2483; H04L 45/021; H04L 47/24; H04L 45/64; H04L 47/28
See application file for complete search history.

(56) References Cited

U.S. PATENT DOCUMENTS 7,159,221 B1 * 1/2007 Willen ................. G06F 9/5044
711/117
7,650,331 B1 1/2010 Dean et al.
(Continued)

FOREIGN PATENT DOCUMENTS

WO  WO-2014/020902 A1  2/2014
WO  WO-2014/021856 A1  2/2014

OTHER PUBLICATIONS

"Open Flow Switch Specification," Version 1.3.0 (Wire Protocol 0x04), Jun. 25, 2012, pp. 1—Title p. 1-106, Open Networking Foundation.
(Continued)

*Primary Examiner* — Hashim S Bhatti
(74) *Attorney, Agent, or Firm* — Hewlett Packard Enterprise Patent Department (57) ABSTRACT

Described herein are techniques enabling the prioritization of network traffic in a distributed processing system. Information may be received regarding a plurality of flows, each flow configured to travel from one node to another node in the distributed processing system. Each flow may comprise a segment of at least one job. A priority associated with each flow may be identified. A flow table modification message for each flow may be generated. The flow table modification message can include a timeout value and a priority value consistent with the priority associated with the flow.

18 Claims, 3 Drawing Sheets

(51) Int. Cl.
  *H04L 12/715* (2013.01)
  *H04L 12/851* (2013.01)
  *H04L 12/841* (2013.01)
  *H04L 29/08* (2006.01)

(52) U.S. Cl.
  CPC .......... *H04L 47/24* (2013.01); *H04L 47/2483* (2013.01); *H04L 47/28* (2013.01); *H04L 67/10* (2013.01)

(56) References Cited

U.S. PATENT DOCUMENTS

| | | | |
|---|---|---|---|
| 9,798,596 B2* | 10/2017 | Vibhor | G06Q 10/06 |
| 9,880,906 B2* | 1/2018 | Gold | G06F 3/0611 |
| 2004/0054999 A1* | 3/2004 | Willen | G06F 9/5044 |
| | | | 718/103 |
| 2009/0210876 A1* | 8/2009 | Shen | G06F 9/505 |
| | | | 718/100 |
| 2011/0154350 A1 | 6/2011 | Doyle et al. | |
| 2011/0292830 A1 | 12/2011 | Yanggratoke et al. | |
| 2013/0104140 A1* | 4/2013 | Meng | G06F 9/4881 |
| | | | 718/104 |
| 2013/0182714 A1 | 6/2013 | Vachharajani et al. | |
| 2015/0088827 A1* | 3/2015 | Xu | G06F 17/30215 |
| | | | 707/634 |
| 2015/0381520 A1* | 12/2015 | Watanabe | G06F 9/4881 |
| | | | 709/226 |
| 2016/0014036 A1* | 1/2016 | Oikawa | H04L 45/308 |
| | | | 370/235 |

OTHER PUBLICATIONS

Guohui Wang et al., "Programming Your Network at Run-Time for Big Data Applications," HotSDN'12, Aug. 13, 2012, Helsinki, Finland, pp. 1-6, ACM.

International Search Report and Written Opinion, International Application No. PCT/US2014/032365, dated Dec. 30, 2014, pp. 1-9, KIPO.

Mario Pastorelli et al., "HFSP: Size-based Scheduling for Hadoop," 2013 IEEE International Conference on Big Data, Oct. 6-9, 2013, pp. 51-59, IEEE.

Matei Zaharia et al., "Job Scheduling for Multi-User MapReduce Clusters," Technical Report No. UCB/EECS-2009-55, Apr. 30, 2009, pp. 1-18, University of California at Berkeley.

Phillip Porras et al., "A Security Enforcement Kernel for OpenFlow Networks," HotSDN'12, Aug. 13, 2012, Helsinki, Finland, pp. 1-6, ACM.

* cited by examiner

PRIORITIZATION OF NETWORK TRAFFIC IN A DISTRIBUTED PROCESSING SYSTEM

BACKGROUND

Distributed processing systems, such as Hadoop MapReduce, are designed such that individual nodes in a cluster can process segments of work for various jobs in parallel. Thus, different segments of work for a given job may be spread over multiple nodes in a cluster. Additionally, a single node may be responsible for processing segments of work from multiple, different jobs. The nodes in a cluster may be connected by a network.

BRIEF DESCRIPTION OF DRAWINGS

The following detailed description refers to the drawings, wherein.

DETAILED DESCRIPTION

As described above, distributed processing systems, such as Hadoop MapReduce, are designed such that individual nodes in a cluster can process segments of work for various jobs in parallel. It is possible for the jobs to have different priorities based on various characteristics, such as who submitted the job. For example, a first job may have a high priority, a second job may have a medium priority, and a third job may have a low priority.

While the distributed processing system can be configured to allocate more resources to perform a job based on priority, the network connecting the nodes of the distributed processing system may not be aware of the differing job priorities. As a result, the network may treat all traffic between nodes the same irrespective of job priority. This can be particularly a problem with Hadoop MapReduce traffic since mapper nodes and reducer nodes may send and receive segments of jobs of varying priority through the same ports, thus making it difficult to distinguish what should be high, medium, or low priority traffic as it all seems to be part of the same network flow.

According to the techniques described herein, temporary flow table modifications can be used to provide priority handling of distributed processing system traffic in a software defined network (SDN). Without altering the distributed processing system, the SDN network can recognize which priority jobs are running on which nodes and thus prioritize the network traffic accordingly. The temporary flow modifications can be enabled using a timeout feature, such as the timeout feature in the OpenFlow communications protocol. The flow modifications can cause switches in the SDN network to increase or decrease network priority of different traffic flows between particular nodes until the timeout expires. Accordingly, this provides a mechanism to temporally prioritize certain network traffic in systems where a single flow may have multiple job priorities. Furthermore, the timeout can be set given a variety of cluster and/or network conditions visible to the SDN control application running on an SDN controller, thus providing flexibility to respond to current conditions.

In an example embodiment, a method may be provided to enable prioritization of network traffic in a distributed processing system. The method can be performed by a processor, such as a processor in an SDN controller or in a computer executing an SDN application. The distributed processing system can be a Hadoop MapReduce system. The processor can access information regarding a plurality of flows, where each flow is configured to travel from a mapper node to a reducer node in a cluster of nodes. Each flow can include a segment of at least one job, and likely will include multiple segments of jobs of varying priority. The processor can identify a highest priority associated with each flow based on the received information. The processor can generate a flow table modification message for each flow. The flow table modification message can include (1) a priority value consistent with the highest priority associated with the flow and (2) a timeout value. The priority value may be a DSCP value to replace the DSCP value of matching network traffic. The timeout value may be calculated based on various characteristics, such as data transfer size, historical information, and current network characteristics. The flow table modification message can be sent to a switch to manage network traffic in accordance with the message. Additional examples, advantages, features, modifications and the like are described below with reference to the drawings.

Figure 1:
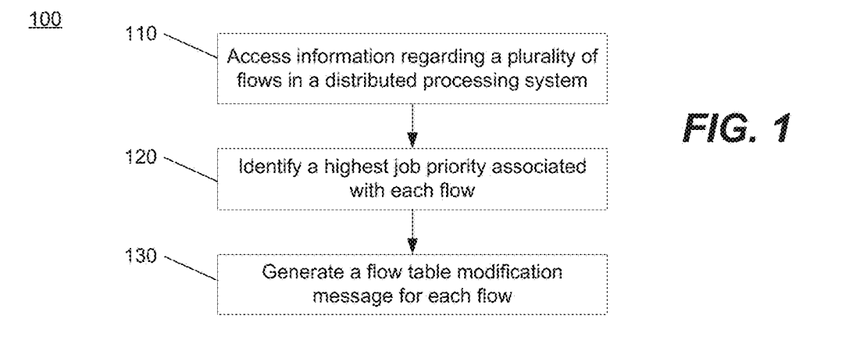
FIG. 1 illustrates a method to enable prioritization of network traffic in a distributed processing system, according to an example.
Figure 2:
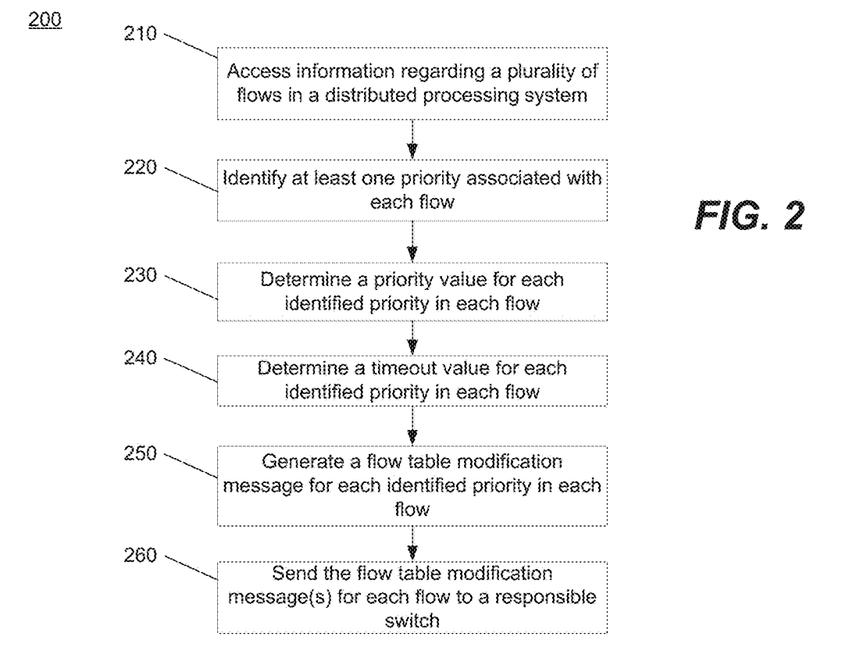
FIG. 2 illustrates a method to enable prioritization of network traffic in a distributed processing system, according to an example.

FIGS. 1 and 2 illustrate methods to enable prioritization of network traffic in a distributed processing system, according to examples. Methods 100 and 200 may be performed by a computing device, system, or computer, such as controller 310 or computer 410. Computer-readable instructions for implementing methods 100 and 200 may be stored on a computer readable storage medium. These instructions as stored on the medium are referred to herein as "modules" and may be executed by a computer.

Figure 3:
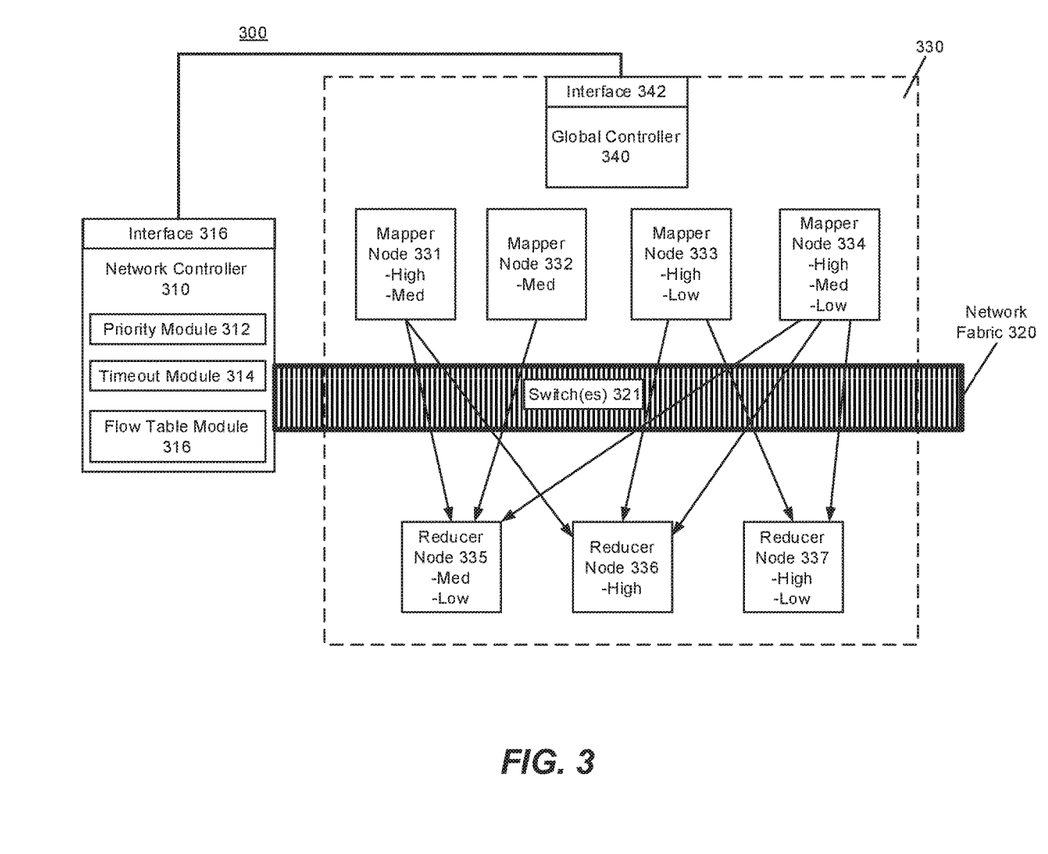
FIG. 3 illustrates a software defined network (SDN) controller to enable prioritization of network traffic for a distributed processing system, according to an example.

Methods 100 and 200 will be described here relative to environment 300 of FIG. 3. Environment 300 may include and/or be implemented by one or more computers. For example, the computers may be server computers, workstation computers, desktop computers, laptops, mobile devices, or the like, and may be part of a distributed system. The computers may include one or more controllers and one or more machine-readable storage media.

A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 300 may include one or more machine-readable storage media separate from the one or more controllers.

Environment 300 may include a number of components. For example, environment 300 may include a network controller 310, a network fabric 320, a cluster of compute nodes 330, and a global controller 340. The environment may also include multiple databases storing data.

The cluster of compute nodes 330 and global controller 340 may be part of a distributed processing system. In this example, the distributed processing system is a Hadoop MapReduce system. Multiple mapper nodes 331-334 are responsible for mapping segments of jobs to reducer nodes 335-337 under control of the global controller 340, which can include a job scheduler, an interface 342, and other components. The reducer nodes 335-337 perform the segments of work mapped to them by the mapper nodes 331-334. In this way, large jobs may be broken down into segments to be processed in parallel over multiple nodes, thus reducing the time needed to execute a job. While only four mapper nodes and three reducer nodes are depicted in FIG. 3, system 300 may include many more nodes. The distributed processing system may also include multiple databases storing the data to be operated on by the nodes.

Environment 300 may be interconnected via network fabric 320. Network fabric 320 may be part of a Software Defined Network (SDN) controlled by one or more network controllers 310. Network fabric 320 may include wired and wireless network elements, such as switches 321, routers, bridges, wireless access points, and the like. An SDN network separates the control plane from the data plane. Such that a network controller (here, network controller 310) can make decisions regarding where and how network traffic is to be sent while the data plane (here, network fabric 320) can be programmed by the network controller to forward and manipulate the traffic. There is also an application plane consisting of one or more SDN applications whose functionality can be implemented by the network controller. In FIG. 3, the priority module 312, timeout module 314, flow table module 316, and interface 318 represent functionality of an SDN application implemented by network cant roller 310, In some examples, the SDN application may be implemented on one or more computers separate from the network controller 310. These one or more computers may host the SDN application and interface with the network controller 310. For purposes of this application, either scenario is intended to be covered when referring to a network controller, such as network controller 310.

Network controller 310 may have other functionality for managing network fabric 320 in accordance with the SDN paradigm. An example communications protocol for implementing an SDN network is OpenFlow. Examples in this disclosure are explained with reference to an OpenFlow implementation of an SDN network. As will be appreciated by one of ordinary skill in the art, the described examples may be implemented using other SDN communications protocols.

According to an OpenFlow implementation, switches 321 in network fabric 320 store one or more flow tables for matching and forwarding network traffic received by the switches 321. The traffic is in the form of packets. The flow tables may include multiple flow table entries including various fields and corresponding information.

A flow able entry may include match fields, priority, instructions, and a timeout value. The match fields are used to determine whether a received packet matches the flow table entry. For example, as used here, the match fields include the source node and destination node for the packet. The priority indicates the priority of the flow table entry in case a packet is matched to multiple flow table entries. In that situation, the highest priority flow table entry is applied to the packet. The instructions are instructions to modify an action set or pipeline processing for the packet. In brief, the action set is the set of actions that will be applied to the packet, such as modifying a differentiated services code point (DSCP) value of the packet. The pipeline processing refers to further processing through other flow tables stored in at least one of switches 321. The timeout value represents a maximum amount of time or idle time before the flow table entry is expired. After the timeout value expires, the flow table entry may be discarded by the switches 321 as it is no longer relevant for processing network traffic. The flow table entry may have other fields and information, consistent with OpenFlow.

Flow table entries in the switches 321 can be created or modified using flow table modification messages (sometimes referred to as "flowmods"). The flow table modification messages may be sent to the switches 321 from the network controller, thus enabling the network controller to program the network fabric to handle network traffic in particular ways. Upon receiving a flow table modification message, a switch of the switches 321 updates its flow table(s) to include a corresponding flow table entry. In some cases a new flow table entry is created based on the flowmod. In other cases, an existing flow table entry is modified based on the flowmod.

As described previously, a potential bottleneck in distributed processing systems can be created by the network connecting the nodes of the system together. In particular, for example, MapReduce processing involves the transfer of significant amounts of data, job segments, and instructions between nodes. Referring to environment 300, the arrows between mapper nodes 331-334 and reducer nodes 335-337 represent the transfer of large amounts of data, job segments, and instructions over network fabric 320. This transfer takes place during the shuffle phase of MapReduce processing.

Moreover, a problem arises when the network traffic includes segments of jobs having different priorities. While the distributed processing system 330 can be configured to allocate more resources to perform a job based on priority, the network fabric 320 connecting the nodes 331-337 may not be aware of the differing job priorities. As a result, the network fabric 320 may treat all traffic between nodes the same irrespective of job priority. This can be particularly a problem with MapReduce traffic since mapper nodes and reducer nodes may send and receive segments of jobs of varying priority through the same ports, thus making it difficult to distinguish what should be high, medium, or low priority traffic as it all seems to be part of the same network flow. For example, the arrow from mapper node 333 to reducer node 337 represents a network traffic flow that may include segments of both high and low priority jobs. As a result, processing of high priority jobs by the distributed processing system may be delayed due to the network.

Method 100 may enable prioritization of network traffic in a distributed processing system, such as system 330. Method 100 may begin at 110, where information regarding a plurality of flows in the distributed processing system 330 may be accessed. The information can be used by method 100 to determine appropriate settings for prioritizing network traffic, as will be explained below.

A flow is a flow of traffic traveling between a source node and a destination node. For example, each arrow connecting a mapper node to a reducer node in system 330 represents a flow. Each flow may comprise multiple segments of jobs being processed by system 330. Because the various jobs may have different priorities, a flow may include job segments of different priorities. The priority level of job segments being processed by the nodes 331-337 are depicted in FIG. 3 for each node.

In particular, mapper node 331 is processing high priority job segments and medium priority job segments. Mapper node 332 is processing only medium priority job segments. Mapper node 333 is processing high priority and low priority job segments. Mapper node 334 is processing a high priority, medium priority, and low priority job segments. On the other hand, reducer node 335 is processing medium and low priority job segments, reducer node 336 is processing only high priority job segments, and reducer node 337 is processing high priority and low priority job segments.

The accessed information may include this priority information. In particular, the information may indicate the priorities associated with the job segments processed on a given node, whether a mapper node or reducer node. The information may also include the data transfer size associated with a given job segment. The data transfer size refers to the amount of data to be transmitted from a mapper node to a reducer node in order to process a corresponding job segment. Additional information may be accessed as well, such as current network conditions.

Network controller 310 may access the information regarding flows in distributed processing system 330. For example, the information may be received via interface 318 from an interface 342 associated with system 330. Interface 342 may be an application programming interface for system 330 implemented by the system's global controller 340. The information may alternatively be derived by analyzing traffic traveling across network fabric 320. Network traffic may be sampled using OpenFlow flowmods to send segments of network traffic to the global controller 340 for analysis. That traffic may be "copied" to the global controller 340 as to avoid interfering with its normal flow in the network. Alternatively, that traffic may be "stolen" to the global controller 340 so that the original network traffic is first sent to the global controller 340 for processing before returning to the network fabric 320. Other network management protocols such as Simple Network Management Protocol (SNMP) may be supported by the global controller 340, allowing more summarized reports of the network traffic and conditions such as specific network link utilization and congestion. The network condition information may be visible to network controller 310 in the normal course of operating the SDN network.

At 120, a highest job priority associated with each flow may be identified by priority module 312. The highest job priority can be identified by examining the accessed information and determining the highest priority job segment being processed by each source node and destination node. For example, the highest job priority of segments processed by mapper node 331 (a source node) is "High". The highest job priority of segments processed by reducer node 335 is "Medium". Thus, for the flow between mapper node 331 and reducer node 335, the highest job priority is "Medium". It is not "High" because reducer node 335 clearly does not process high priority job segments. Thus, it can be deduced that the flows entering reducer node 335 cannot include high priority job segments, including the flow from mapper node 331.

In another example, the flow between mapper node 332 and reducer node 335 has a highest job priority of "Medium". This result may seem more intuitive since both source and destination nodes have a highest job priority of "Medium". As still another example, the flows between either of mapper node 333 or mapper node 334 and reducer node 336 or reducer node 337 have a highest job priority of "High." In contrast, the flow between mapper node 334 and reducer node 335 has a highest job priority of "Medium". As can be seen, in the current state of the MapReduce system, none of the flows between source and destination have a highest job priority of "Low", as that would require both the mapper node and reducer node to process only job segments of low priority. Note that method 200 explains how the lower priority levels of other job segments may be taken into account.

At 130, a flow table modification message may be generated for each flow by flow table module 316. The flow table modification message may include information for creating a flow table entry for the flow. For example, the flow table modification message may include a priority value consistent with the identified highest job priority associated with the flow. This priority value is different from the priority field in an OpenFlow flow table entry. The priority field, referred to herein as "flow table priority", is used to prioritize one matching flow table entry over another. In contrast, the priority value is used to appropriately prioritize network traffic that matches a flow table entry created or modified based on the flow table modification message. The priority value may specify a differentiated services code point (DSCP) value that is to be used to prioritize the matched packet. Thus, the priority value may be implemented via the instructions field of the flow table entry. In particular, for example, upon determining that a packet matches the flow table entry (which was created/modified based on the flow table modification message), a switch of the switches 321 may execute the instructions in the flow table entry. These instructions may cause the switch of the switches 321 to modify the DSCP value of the matched packet to the DSCP value specified by the priority value. For instance, where the flow table entry corresponds to higher priority traffic, the DSCP value of matched packets might be elevated to a higher value. On the other hand, where the flow table entry corresponds to lower priority traffic, the DSCP value of matched packets might be lowered.

The flow table modification message may also include a timeout value. The timeout value may be generated by timeout module 314. The timeout value can be used to control how long the priority processing dictated by the flow table modification message will be implemented. For example, just because a flow currently has high priority job segments does not mean that it will in the future. Thus, it may be desirable to schedule the priority processing to occur only for a certain amount of time. This can be accomplished in OpenFlow using the timeout field. The timeout value can be generated based on a number of factors. For example, timeout module 314 may set the timeout value based on the mixture of job priorities associated with a respective flow, network characteristics, historical priority information, and data transfer sizes associated with jobs in the flow.

For example, the timeout module 314 could use the job run history to predict what priority different paths will be. It could also use a form of temporal caching of flows to determine the timeout value. For instance, a flow between a particular mapper node and reducer node that was consistently high priority in the past may be likely to be consistently high priority in the future, so therefore the timeout value can be higher. As an example, reducer node 336 appears to be dedicated to processing high priority job segments. There may be reasons for such a condition, such as reducer node 336 having certain computer resources that are exclusively used in high priority jobs. Alternatively, certain nodes may simply be dedicated to high priority jobs to guarantee a certain level of performance for such jobs. This is particularly true with MapReduce where computation is sent to the data. Therefore the job priority level of the mapper nodes (331, 332, 333, 334) are a better representation of future job priorities that might run on those nodes if the system job priority maps to specific data associated with those jobs. While such information may not be available to network controller 310, it may nonetheless deduce that reducer node 336 is likely to have high priority jobs, as described here. The timeout values may also be set based on the reported network congestion that network controller 310 is monitoring. In this case, timeouts could be used to adapt to the network congestion. Finally, the data transfer size associated with a job segment can be considered in determining the appropriate timeout value. A flow with a high priority job segment requiring a large data transfer would benefit from a longer timeout value than would a high priority job segment requiring a smaller data transfer.

Additionally, the flow table modification message may include other details, such as match fields, instructions, and flow table priority. The match field, for example, may specify the source node and destination node for the given flow, so that the flow can be appropriately matched to the corresponding flow table entry. The instructions may be used to implement priority processing of network traffic, such as described above regarding the priority value. The flow table priority may be used to specify the priority of the flow table entry that will be created based on the flow table modification message.

The flow table modification message may then be sent to at least one switch of the switches 321 in the network fabric 32a The flow table modification message for a given flow may be sent only to those switches of the switches 321 that are responsible for forwarding traffic between the mapper node and reducer node associated with the flow. Upon receiving the message, the at least one switch of the switches 321 may alter their flow table to include a flow table entry in accordance with the flow table modification message. For example, an existing flow table entry may be modified or a new flow table entry may be created. After updating of the flow table, the at least one switch of the switches 321 will forward network traffic associated with the flow according to the priority value in the flow table entry until the timeout value expires.

A new flow table modification message may be generated by network controller 310 and sent to the at least one switch of the switches 321 upon receiving additional information requiring a change in priority for the given flow. For example, network controller 310 can generate a new flow table modification message upon accessing or receiving new information regarding the distributed processing system 330, such as new flows, new job segments, new job priorities, etc., or new information regarding network conditions, Additionally, upon expiration of the timeout value, the at least one switch of the switches 321 will delete a flow table entry. In an OpenFlow SDN network, the at least one switch of the switches 321 notifies network controller 310 when it deletes a flow table entry. Upon receiving such a notification, network controller 310 can generate a new flow table modification message taking into account current network conditions and priority information between the mapper node and reducer node.

FIG. 2 illustrates a method to enable prioritization of network traffic in a distributed processing system, according to an example. In particular, method 200 illustrates how the different priorities of multiple job segments may be handled by the network. Method 200 may begin at 210, where information may be accessed regarding a plurality of flows in distributed processing system 330. One or more of the flows may include job segments having different priorities, as illustrated in system 330.

At 220, each priority of job segments within a flow may be identified by priority module 312. For instance, in the flow between mapper node 334 and reducer node 337, both the "High" priority and the "Low" priority can be identified. A "Medium" priority is not identified for the flow since reducer node is not processing any medium priority job segments. At 230, a priority value may be determined for each identified priority in each flow by priority module 312. The priority value for a given priority should be consistent with the given priority. For example, a high priority value may be determined for the "High" priority portion of the flow and a low priority value may be determined for the "Low" priority portion of the flow. As before, these priority values may specify DSCP values.

At 240, a timeout value may be determined for each identified priority in each flow by timeout module 314. The timeout value may be determined as described earlier. The timeout value for each portion may be based on characteristics associated with the portion of the flow that corresponds to the particular priority. For instance, for the flow between mapper node 334 and reducer node 337, the timeout value associated with the "High" priority portion of the flow may be calculated based on data transfer size associated with the high priority job segments in the flow. Similarly, the timeout value associated with the "Low" priority portion of the flow may be calculated based on data transfer size associated with the low priority job segments in the flow. The global controller's 340 and/or network controller's 310 knowledge of Network Topology (network links, link speeds, link utilization) can be used to calculate the expected transfer time and translate that to a timeout value.

At 250, a flow table modification message may be generated for each identified priority in each flow by flow table module 316 and sent to one or more responsible switches of the switches 321 in the network fabric 320 (block 260). The flow table modification message for each identified priority may include the determined priority value, the determined timeout value, and a flow table priority, as well as other details such as match fields. The flow table priority is used to indicate the higher priority flow table entry where there are two entries with the same match fields.

For example, for the flow between mapper node 334 and reducer node 337, there will be two flow table modification messages with the same match fields (where the match fields are the source node and destination node). Thus, a responsible switch of the switches 321 receiving the two flow table modification messages should know how they relate to each other so that it can create corresponding flow table entries in its flow table that don't conflict. The flow table priority clarifies which flow table entry should take precedence.

In this case, the flow table modification message associated with the "High" priority can be given the higher flow table priority and the flow table modification message associated with the "Low priority" can be given a lower flow table priority. Then, an incoming packet in the flow will be matched to the higher priority flow table entry while that entry is in existence. Meanwhile, the lower priority flow table entry will sit in the responsible switch's flow table until the higher priority flow table entry expires based on its timeout value. At that point, incoming packets in the flow will be matched to the lower priority flow table entry since it now has the highest priority. Thus, although at any given time only one priority level will be enforced for the flow, it does allow for a more complex prioritization having multiple levels of priority over time. This can be especially advantageous where there are a large number of priorities associated with job segments.

Figure 4:
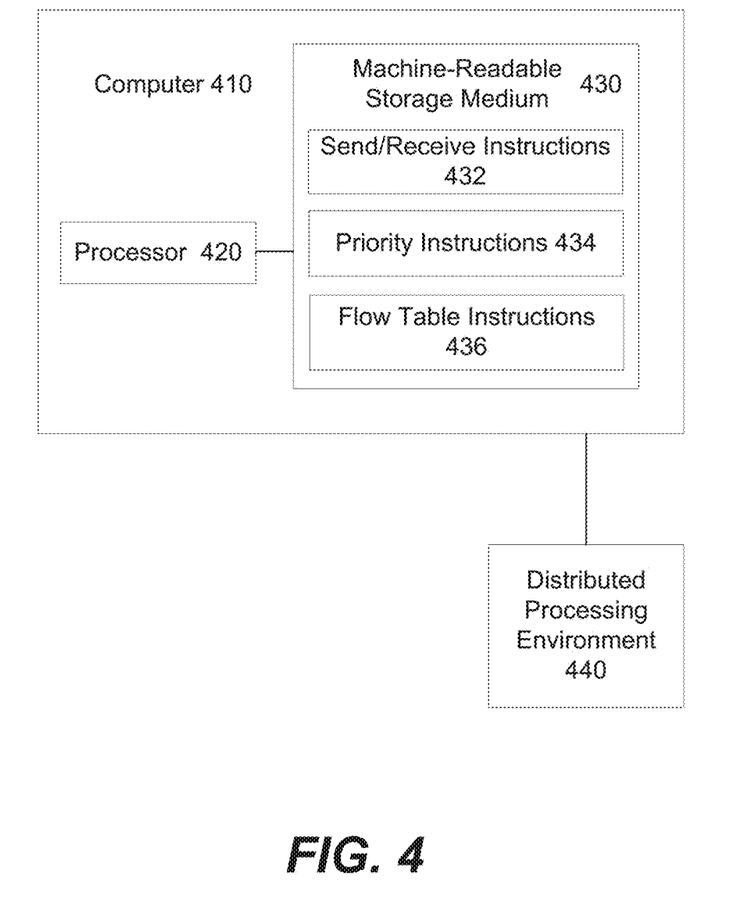
FIG. 4 illustrates a computer-readable medium to enable prioritization of network traffic in a distributed processing system, according to an example.

FIG. 4 illustrates a computer-readable medium to enable prioritization of network traffic in a distributed processing system, according to an example. Computer 410 may include and/or be implemented by one or more computers. For example, the computers may be server computers, workstation computers, desktop computers, laptops, mobile devices, or the like, and may be part of a distributed system. The computers may include one or more controllers and one or more machine-readable storage media, as described with respect to environment 300, for example.

In addition, users of computer 410 may interact with computer 410 through one or more other computers, which may or may not be considered part of computer 410. As an example, a user may interact with computer 410 via a computer application residing on a computer, such as a desktop computer, workstation computer, tablet computer, or the like. The computer application can include a user interface (e.g., touch interface, mouse, keyboard, gesture input device).

Computer 410 may perform methods 100 and 200, and variations thereof. Additionally, the functionality implemented by computer 410 may be part of a larger software platform, system, application, or the like. For example, computer 410 may be part of an SDN network and may implement a network controller for the SDN network, such as network controller 310. Alternatively, computer 410 may be separate from the network controller and may merely host an SDN application that interfaces with the network controller. Computer 410 may be connected to distributed processing environment 440 via a network. Distributed processing environment 440 may include a distributed processing system (e.g., Hadoop MapReduce) and an SDN network, such as shown in environment 300 of FIG. 3.

Processor 420 may be at least one central processing unit (CPU), at least one semiconductor-based microprocessor, other hardware devices or processing elements suitable to retrieve and execute instructions stored in machine-readable storage medium 430, or combinations thereof. Processor 420 can include single or multiple cores on a chip, multiple cores across multiple chips, multiple cores across multiple devices, or combinations thereof. Processor 420 may fetch, decode, and execute instructions 432-436 among others, to implement various processing. As an alternative or in addition to retrieving and executing instructions, processor 420 may include at least one integrated circuit (IC), other control logic, other electronic circuits, or combinations thereof that include a number of electronic components for performing the functionality of instructions 432-436. Accordingly, processor 420 may be implemented across multiple processing units and instructions 432-436 may be implemented by different processing units in different areas of computer 410.

Machine-readable storage medium 430 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 430 can be computer-readable and non-transitory. Machine-readable storage medium 430 may be encoded with a series of executable instructions for managing processing elements.

The instructions 432-436 when executed by processor 420 (e.g., via one processing element or multiple processing elements of the processor) can cause processor 420 to perform processes, for example, methods 100 and 200, and/or variations and portions thereof.

For example, send/receive instructions 432 may cause processor 420 to receive information regarding a plurality of flows. Each flow may be configured to travel from a mapper node to a reducer node in a cluster of nodes. Each flow can include a segment of at least one job. The information may be received from a network controller, from an application programming interface of the distributed processing system in environment 440, and/or from the analysis of network traffic sent through the SDN network within environment 440. Priority instructions 434 can cause processor 420 to identify at least one priority associated with each flow based on the received information. Flow table instructions 436 can cause processor 420 to generate a flow table modification message for each identified priority in each flow. Each flow table modification message can include a priority value consistent with one of the identified priorities, a timeout value after which a corresponding flow table entry will expire, and a flow table priority. Send/receive instructions 432 can cause processor 420 to send the flow table modification message for identified priority in each flow to a switch configured to transmit traffic between the mapper node and the reducer node for the respective flow.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method to enable prioritization of network traffic in a distributed processing system, comprising, by a processor:
accessing information regarding a plurality of flows, each flow configured to travel from a mapper node to a reducer node in a map-reduce cluster of nodes, each flow comprising a segment of at least one job;
identifying a highest job priority associated with each flow based on the accessed information; and
generating a flow table modification message for each flow, the flow table modification message comprising (1) a priority value consistent with the highest job priority associated with the flow and (2) a timeout value.

2. The method of claim 1, further comprising sending the flow table modification message for each flow to at least one switch, wherein the at least one switch is configured to forward traffic between the map-reduce cluster of nodes.

3. The method of claim 2, wherein the at least one switch to which the flow table modification message for a given flow is sent is responsible for forwarding traffic from the mapper node to the reducer node for the given flow, and wherein the at least one switch alters its flow table to include a flow table entry for the given flow in accordance with the flow table modification message.

4. The method of claim 3, wherein for the given flow, the at least one switch forwards traffic associated with the given flow according to the priority value in the flow table entry until the timeout value expires.

5. The method of claim 4, wherein the priority value specifies a replacement differentiated services code point (DSCP) value, and wherein instructions in the flow table entry cause the at least one switch to replace an existing DSCP value in a received packet with the replacement DSCP value, and wherein the received packet is matched to the flow table entry.

6. The method of claim 1, wherein the highest job priority associated with each flow is determined by identifying a highest job priority associated with any of the segments of the at least one job in the flow.

7. The method of claim 6, wherein at least one of the flows comprises segments of multiple jobs having different job priorities, the method further comprising:
identifying additional job priorities associated with the segments of the multiple jobs in the at least one of the flows;
generating additional flow table modification messages for the identified additional job priorities of the at least one of the flows, each flow table modification message comprising (1) a priority value consistent with one of the identified job priorities, (2) a timeout value, and (3) a flow table priority.

8. The method of claim 7, further comprising:
sending the additional flow table modification messages for the at least one of the flows to a switch responsible for forwarding traffic from the mapper node to the reducer node for the at least one of the flows, wherein the switch is configured to match received traffic to the flow table entries generated from the flow table modification messages based on the flow table priority, such that where network traffic matches multiple flow table entries, the flow table entry having a highest flow table priority is applied to the traffic.

9. The method of claim 6, wherein the timeout value for each flow is determined based on the network link speeds, utilization, and a data transfer size associated with the segment of the at least one job in the flow having the highest priority.

10. The method of claim 1, wherein the timeout value for each flow is determined based on a mixture of job priorities associated with the flow.

11. The method of claim 1, wherein the timeout value for each flow is determined based on network characteristics visible to a controller.

12. The method of claim 1, wherein the timeout value for each flow is determined based on historical priority information associated with the flow.

13. The method of claim 1, further comprising:
for a given flow, generating a new flow table modification message upon receiving additional information requiring a change in priority for the given flow.

14. A software defined network (SDN) controller to enable prioritization of network traffic in a distributed processing system, comprising:
an interface to receive information regarding a plurality of flows, each flow configured to travel from a sending node to a receiving node in a distributed processing system, each flow comprising a segment of at least one job under execution in the distributed processing system;
a priority module to determine at least one priority associated with each flow;
a timeout module to determine a timeout value for each determined priority in each flow; and
a flow table module to, for each flow, generate a flow table modification message for each determined priority, the flow table modification message comprising (1) a priority value consistent with one of the determined priorities, (2) the determined timeout value for the one of the determined priorities, and (3) a flow table priority.

15. The SDN controller of claim 14, wherein the interface is configured to receive the information from an application programming interface of the distributed processing system.

16. The SDN controller of claim 14, comprising a second interface to send the generated flow table modification message for each flow to a managed switch responsible for forwarding data from the sending node to the receiving node for the respective flow.

17. The SDN controller of claim 14, wherein the timeout module is configured to determine the timeout value for each flow based on at least one of a mixture of job priorities associated with a respective flow, network characteristics, historical priority information, and a data transfer size associated with a job in the flow having the highest priority.

18. A non-transitory computer-readable storage medium storing instructions for execution by a processor to enable prioritization of network traffic in a distributed processing system, the instructions when executed causing the processor to:
access information regarding a plurality of flows, each flow configured to travel from a mapper node to a reducer node in a cluster of nodes, each flow comprising a segment of at least one job;
identify at least one priority associated with each flow based on the accessed information;
for each flow, generate a flow table modification message for each identified priority, each flow table modification message comprising (1) a priority value consistent with one of the identified priorities, (2) a timeout value after which a corresponding flow table entry will expire, and (3) a flow table priority; and
send the flow table modification message for each identified priority in each flow to a switch configured to transmit traffic between the mapper node and the reducer node for the respective flow.

* * * * *